UNITED STATES PATENT OFFICE.

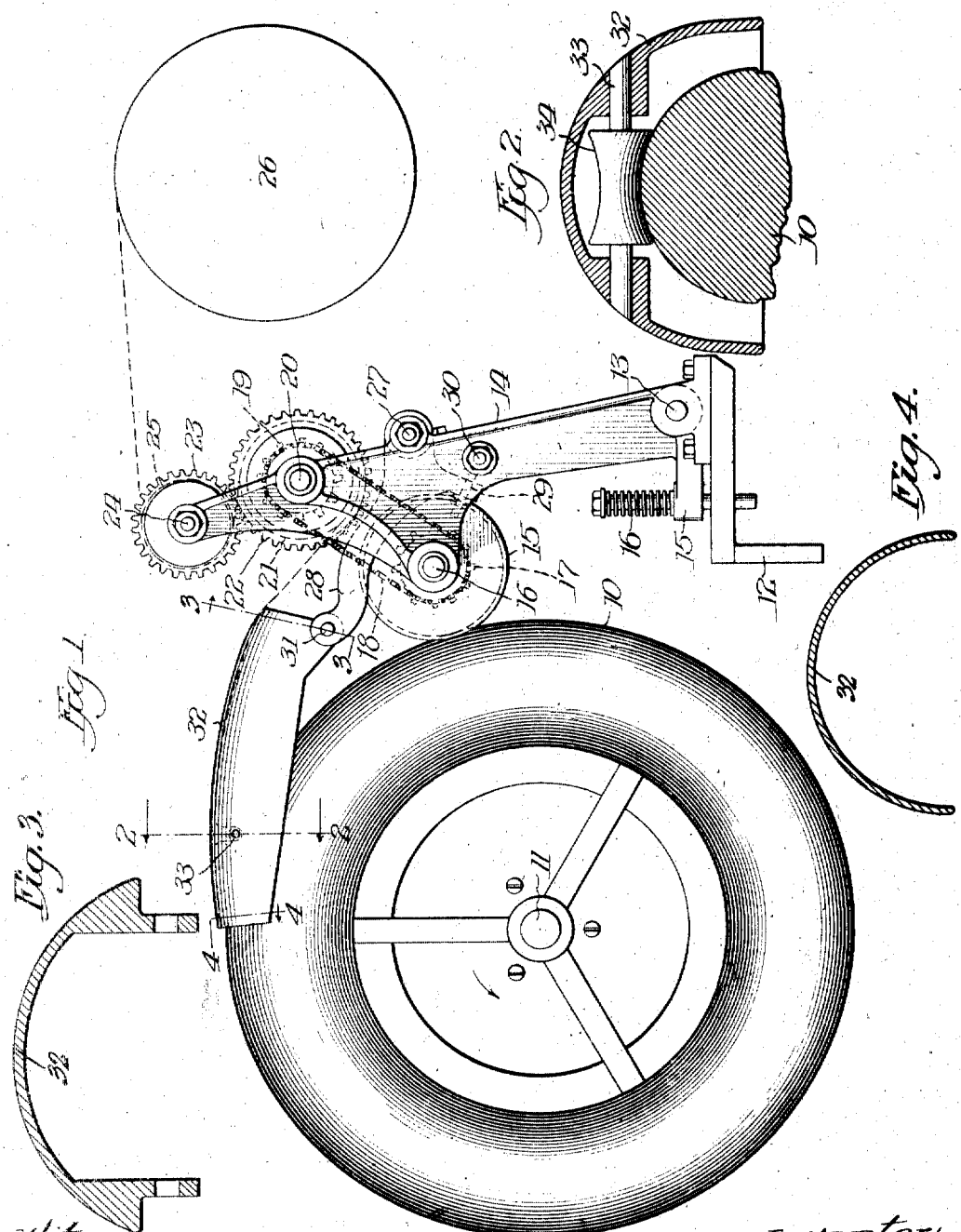

WILLIAM C. STEVENS, OF AKRON, OHIO, ASSIGNOR TO THE FIRESTONE TIRE & RUBBER COMPANY, OF AKRON, OHIO, A CORPORATION OF OHIO.

FABRIC-SPREADER FOR TIRE-MAKING MACHINES.

1,276,436.

Specification of Letters Patent.

Patented Aug. 20, 1918.

Application filed May 18, 1914. Serial No. 839,261.

*To all whom it may concern:*

Be it known that I, WILLIAM C. STEVENS, a citizen of the United States, residing at Akron, in the county of Summit and State of Ohio, have invented certain new and useful Improvements in Fabric-Spreaders for Tire-Making Machines, of which the following is a specification.

In the making of fabric carcasses of the shoes or casings of automobile tires, it is usual to superimpose a plurality of frictional fabric plies on a form or core and shape them to the latter. It is also customary to stretch such rubber-impregnated plies in order to secure proper adhesion between them, to prevent undue stretching upon inflation of the inner tube and to render the shaping or forming of the ply easier. Such stretching or elongation is readily accomplished by rotating the core during the application of the ply and employing some retarding or stretching means to effect the proper elongation of the ply, the greater stretching occurring in the central zone of the latter. In some stretching devices the fabric is passed around retarding or stretching drums or rollers and leaves the latter substantially flat, passing directly to the transversely-curved, revoluble core or form. In thus changing the ply from a flat to a curved conformation longitudinal wrinkles tend to form therein and, unless completely eliminated before the sticky fabric reaches the core proper application of the ply to the latter is rendered either difficult or impossible.

The leading object of this invention is the provision, in a device of this general character, of means to prevent the occurrence of such wrinkles, in this way facilitating the application of the adhesive ply to the form or core.

In order that those skilled in this art may have a full and complete understanding of this invention, I have illustrated a desirable embodiment of the same in the accompanying drawing, which forms a part of this specification and to which reference will be had in connection with the following detailed description.

In this drawing,

Figure 1 is a fragmentary view of a tire making machine; and

Fig. 2 is a fragmentary cross-section on the line 2—2 of Fig. 1.

Fig. 3 is a cross section on the line 3—3 of Fig. 1. Fig. 4 is a cross section on the line 4—4 of Fig. 1.

In this machine, a round form or core 10 is demountably secured to a shaft 11, which is driven in the direction indicated by the arrow by any suitable driving means, as, for instance, an electric motor. The main frame 12 of the machine has hinged or pivoted thereon, at 13, a frame 14, with one or more forwardly-extended feet 15', acted upon by coiled expansion springs 16', which, as will be readily understood, tend to rock the frame on its hinged supports 13 toward the core. This frame 14 carries a revoluble wheel 15, the concave face of which is adapted to be pressed against and travel on the surface of the form 10, and acting as a retarding or dragging roll as illustrated. Driving contact of the concave retarding roller 15 with the surface of the core, however, is made by the pull on the fabric exerted by the core in its rotation and also by the weight of the frame carrying the stretching mechanism. This wheel 15 is mounted on a shaft 16, the latter also having fixed thereto a sprocket wheel 17, with which coöperates a sprocket chain 18 passing around a similar sprocket wheel 19, on another shaft 20 of the frame or standard 14. Shaft 20 has mounted thereon a stretching drum or roller 21 and also a gear 22, the teeth of the latter meshing with those of a similar gear 23 fastened to an upper shaft 24, also revolubly mounted in suitable bearings in the frame 14. Shaft 24 also carries a second stretching roller or drum 25. The device also includes a stock roll 26, from which the rubber-impregnated fabric plies are unwound as required.

The frame 14, at 27, has hinged thereto a frame or bracket 28, carrying an adjustable stop screw 29 adapted to bear against a rod or shaft 30, thereby limiting and restricting the downward swinging of the frame 28 on its hinge or pivot shaft 27. This frame 28, at 31, has hinged thereto a longitudinally and transversely curved fabric spreader or guide 32, which overhangs or overlies a portion of the form or core 10, as is clearly illustrated in Fig. 1. The free end of this fabric spreader is equipped internally with a rod or shaft 33, on which is revolubly mounted a concaved roller 34 adapted to bear on the face of core 10.

The frictioned fabric, upon leaving the stock drum or roller 26, passes part way around the drum 25 and also part way around the drum 21, in reverse directions, and, in leaving the under side of the latter drum, it passes over the fabric guide or spreader 32 onto the core or form 10. As the latter rotates, it draws the fabric from the stock roll 26 around and over the various parts of the mechanism, as indicated, and, owing to the fact that the concave retarding roller 15 bears against the surface of the core, and the gearing is such that the surface speed of the stretching roller 21 is less than that of the form 10, the fabric is stretched as it passes between the retarding rollers and the form. The fabric spreader 32 is curved both longitudinally and transversely, converging from a wide gradual curve near the tension roller to a narrow more abrupt curve closely approximating that of the core at the end of the spreader and is so positioned and so shaped, both longitudinally and transversely, that without transverse stretching of the fabric and merely the absorption of the fullness evidenced by the presence of the longitudinal wrinkles it prevents the formation of wrinkles in the fabric as it passes from the roller 21 to the form. The fabric is delivered at the advance end of the member 32 to the core in smooth, unwrinkled condition, so that its subsequent transverse shaping to the conformation of the core may be readily accomplished by mechanism not shown.

In a device of this kind, it will be clear that this fabric spreader may be swung upwardly out of the way when required, and that its forward end, in normal, operative position, is supported directly by the form or core and the plies of fabric, if any have been previously placed on the form. After the fabric has been applied to the core by the mechanism shown and described, it is stitched or formed to the sides of the core by any suitable mechanism. During the shaping or forming, it is desirable to rotate the core at a higher speed than that used in the stretching, and it is during this time, that the springs 16' are useful, as they prevent the roller 15 carrying the frame, from bouncing or jumping when it runs over the splices on the core.

By employing a mechanism of this character, the tire carcasses may be built up on the core or form with facility and despatch, because the fabric is delivered to the core without wrinkles, so that no difficulty is encountered in eliminating such defects, if once permitted to form. This forming and shaping of the fabric ply during its travel from the stretching roller to the core is automatic in its action and requires no attention on the part of the attendant. The peculiar shape of the spreader which starting at a long curve converging to the shape of the core, and also curving upwardly longitudinally, gradually but effectually shapes the fabric from the flat form in which it is delivered by the tension roll to the curved shape it assumes on the core this being accomplished without the formation of longitudinal wrinkles such as would occur were not spreading means provided similar to the one shown herein. In many instances heretofore, it has been customary to pull the fabric ply crosswise in opposite directions just before it reaches the core or form, to avoid the presence of wrinkles or folds in the fabric or air pockets between the plies. By the employment of this mechanism, however, all such requirements on the part of the operator are overcome, rendering the machine more effective in the carrying out of its work.

I claim:

1. In a machine for making tires from fabric, the combination with a transversely curved core and a device which delivers the fabric to the core in flat condition of means for absorbing the fullness of the fabric comprising a transversely and longitudinally curved fabric contacting surface which is tapered toward the core, the tapering end resting over the core and correspondingly curved.

2. In a machine for making tires from fabric, the combination of means for delivering the fabric in flat condition, a transversely curved core to which the fabric is delivered and a fabric spreader intermediate the delivery means and the core, the spreader gradually tapering from a curvature of longer radius to a curvature of shorter radius corresponding to the shape of the core and adapted to shape the fabric to the core in a single bend.

3. In a machine for making tires the combination of fabric delivery means, and a transversely curved core to which the fabric is delivered of an intermediate fabric spreader, the spreader being curved both longitudinally and transversely, the radius of transverse curvature being greater at the end nearer the delivery means and tapering toward the core, and adapted to conform the fabric to the curvature of the core without transverse stretching.

4. In a machine for making tires, the combination of fabric delivery means, and a transversely curved core to which the fabric is delivered of a fabric spreader located between the fabric delivery means and the core, and contacting the fabric between these points, the spreader being wider adjacent the delivery means and tapering toward the core, and adapted to conform the fabric to the curvature of the core without transverse stretching.

WILLIAM C. STEVENS.

Witnesses:
J. J. SHEA,
S. G. CARKHUFF.